US006470227B1

(12) United States Patent
Rangachari et al.

(10) Patent No.: US 6,470,227 B1
(45) Date of Patent: Oct. 22, 2002

(54) METHOD AND APPARATUS FOR AUTOMATING A MICROELECTRIC MANUFACTURING PROCESS

(76) Inventors: Murali D. Rangachari, 37520 Summer Holly Common, Fremont, CA (US) 94536; Arun Kumar Sharma, 10832 Brookwell Dr., Cupertino, CA (US) 95014; Ramesh Balakrishnan, 500 Palo Alto Ave., Palo Alto, CA (US) 94301; Balaji Pitchaikani, 13048, Cuhbra Vista G, Los Altos Hills, CA (US) 94022

(*) Notice: Subject to any disclaimer, the term of this patent is extended or adjusted under 35 U.S.C. 154(b) by 0 days.

(21) Appl. No.: 09/204,421

(22) Filed: Dec. 2, 1998

Related U.S. Application Data

(60) Provisional application No. 60/067,150, filed on Dec. 2, 1997.

(51) Int. Cl.[7] ............................................ G06F 19/00
(52) U.S. Cl. ............................................................ 700/95
(58) Field of Search ......................... 700/117, 95, 100, 700/97, 99

(56) References Cited

U.S. PATENT DOCUMENTS

| | | | | | |
|---|---|---|---|---|---|
| 5,014,208 A | * | 5/1991 | Wolfson | ...................... | 700/99 |
| 5,247,254 A | * | 9/1993 | Huber et al. | ................. | 324/212 |
| 5,251,169 A | * | 10/1993 | Josephson | .............. | 365/185.05 |
| 5,319,590 A | * | 6/1994 | Montoye | ..................... | 365/49 |
| 5,386,413 A | * | 1/1995 | McAuley et al. | ........... | 370/392 |
| 5,402,349 A | * | 3/1995 | Fujita et al. | .................... | 700/97 |
| 5,410,634 A | * | 4/1995 | Li | ................................ | 706/62 |
| 5,444,632 A | * | 8/1995 | Kline et al. | ................. | 700/100 |
| 5,490,097 A | * | 2/1996 | Swenson et al. | ............... | 703/2 |
| 5,524,253 A | * | 6/1996 | Pham et al. | ................. | 709/202 |
| 5,528,503 A | * | 6/1996 | Moore et al. | ................. | 700/95 |
| 5,576,946 A | * | 11/1996 | Bender et al. | ................ | 700/17 |
| 5,644,686 A | * | 7/1997 | Hekmatpour | ................ | 706/45 |
| 5,745,113 A | * | 4/1998 | Jordan et al. | ................ | 345/349 |
| 5,841,874 A | * | 11/1998 | Kempke et al. | .............. | 713/160 |
| 5,870,768 A | * | 2/1999 | Hekmatpour | ................ | 707/501 |
| 5,881,230 A | * | 3/1999 | Christensen et al. | ........ | 709/217 |
| 5,920,886 A | * | 7/1999 | Feldmeier | ................... | 711/108 |
| 5,930,359 A | * | 7/1999 | Kempke et al. | ............. | 713/160 |
| 5,933,638 A | * | 8/1999 | Cencik | .......................... | 717/4 |
| 5,983,195 A | * | 11/1999 | Fierro | ......................... | 705/10 |
| 6,111,351 A | * | 8/2000 | Pong et al. | ................. | 313/422 |

FOREIGN PATENT DOCUMENTS

WO        WO 98/071      * 3/1998

* cited by examiner

*Primary Examiner*—Leo Picard
*Assistant Examiner*—Chad Rapp
(74) *Attorney, Agent, or Firm*—O'Melveny & Myers LLP

(57) ABSTRACT

The present invention provides for a method of automating a microelectronic manufacturing process by configuring application objects that implement a domain knowledge for a piece of equipment and implementing a workflow using the application object where the workflow represents a sequence of steps in the microelectronic manufacturing process. The method is embodied in a computer program that is part of a computer system.

30 Claims, 8 Drawing Sheets

METHOD AND APPARATUS FOR AUTOMATING A MICROELECTRIC MANUFACTURING PROCESS

This application claims the benefit of U.S. Provisional Application No. 60/067,150, filed Dec. 2, 1997.

BACKGROUND OF THE INVENTION

1. Field of the Invention

The present invention generally relates to automation systems, and more particularly, to a method and apparatus for automating equipment used in a microelectronic manufacturing process.

2. Description of Related Art

Automation systems have been used in a variety of microelectronic manufacturing processes such as in processes to manufacture semiconductor devices, flat panel devices and disk drive devices. For example, in a typical semiconductor manufacturing facility (Fab), semiconductor fabrication equipment and metrology equipment are used to fabricate and test semiconductor devices located on silicon wafers. In the past, the manual operation of equipment in a Fab has been gradually replaced by an automated process to alleviate costly semiconductor manufacturing problems associated with non-automated, manual operations.

Manual operation of equipment in a Fab has numerous limitations. These problems are normally associated with human error in the handling of wafers grouped in lots that result in misprocessing due to human error and fatigue. The problems are also associated with the improper interaction with many external information systems, as well as devices, that must all be synchronized for efficient manufacturing production. For example, errors in the routing or the processing of wafer lots are costly and can be the largest problem area in semiconductor manufacturing. A reduction in the occurrence of wrong lots being loaded into process equipment or selecting the wrong process recipes is needed to prevent errors in routing and processing.

A second problem area in manually operating equipment is that errors occur during the manual data collection process. Manufacturing operators often manually enter data at each process step and interact with the Manufacturing Execution System (MES) dozens of times for each individual wafer lot being processed. Each time an operator manually enters data into the MES, errors can be inadvertently introduced. These errors can compromise the integrity of the MES database as well as the validity of manufacturing decisions based on the data contained therein. To improve manufacturing quality, sampling of wafer lots must be performed automatically since the amount of sampling needed is too large of an amount for manual operators to support. In addition, this constant interaction with the MES slows the production process and decreases effective productivity due to the inefficient use of an operator's time. Furthermore, the amount of data that an operator can manually input is limited. With processing becoming more complicated, manual operation has exceeded human capabilities.

A third problem area addressed by semiconductor manufacturing automation is the control of wafer lot location and identification during the manufacturing process. Tracking and identifying thousands of lots throughout a Fab is a time consuming and error-prone process. This is especially true when multiple lots are located and processed simultaneously, using fewer ports on equipment for loading and unloading the lots. Wrong identification of lots may result in the complete loss of the lot, which, in turn, results in delays of lots to customers. Automation processes are able to interact with intelligent tracking devices normally placed on individual lots to exchange control and tracking information. The semiconductor industry has thus moved to automated semiconductor manufacturing processes to alleviate these problems of manually operating a Fab.

While automated semiconductor processes have alleviated the material handling problems described above, these automated processes are costly, time consuming, have limited reusability and limited extensibility. Present automation processes are costly due to the amount of time and resources needed to characterize new equipment and then develop a custom (close fitting) automation software or a general purpose (loose fitting) automation software to automate the equipment in a Fab. In either case, a large amount of. effort is spent in rigorously testing the automation software (e.g. testing of 40–60 software programs (one for each equipment) in the case of the custom software and one giant software program (for the general purpose software). In addition, any code changes in either the custom or general purpose software has global system ramifications that must be performed by experienced programmers. Furthermore, any changes to the code requires regression testing on all equipment types to be certified for production release. The software release management thus becomes very critical, prone to errors and time consuming. The use of the custom automation software and/or general purpose software to characterize new semiconductor equipment is defined as the "Code Model."

A problem with the Code Model is the excessive amount of time needed to prepare the computer code to characterize a new piece of equipment. A programmer may need approximately two to three weeks of total programming time to characterize a single piece of equipment. Since a conventional Fab may have approximately 40 to 60 different types of equipment that must be characterized, the amount of time to characterize all the new equipment in the Fab results in a costly amount of programming time. In addition, a significant amount of equipment downtime is incurred as the equipment is being characterized that negatively affects production.

In addition to the excessive amount of time needed to characterize new equipment using the Code Model, a significant amount of time is also needed to make changes to the custom and/or general purpose software to correspond to software revisions made to existing equipment by the manufacturer. Furthermore, throughout the equipment's use in a Fab, the process flows for fabricating a semiconductor device may change over time or other parameters in the fabrication may change. Thus, for example, should a new process step be added to the process flow for fabricating a certain semiconductor device, or should the characterization need to be adjusted for a piece of equipment, the Code Model requires that a build of the custom and/or general purpose software be performed repeatedly. Repeated builds take a substantial amount of programming and testing time as well as equipment downtime to accomplish. There is therefore a need to reduce the costs associated with updating the custom and/or general purpose software, as well as costs incurred due to downtime of the equipment. The costs incurred with the Code Model are associated with the limited reusability of the custom and/or general purpose software since that software must be updated when new process steps or additional characterization is needed. Likewise, extensibility of an automation process utilizing the Code Model is limited due to the additional programming needed.

An attempted solution to the Code Model problem has been to move towards an object-oriented solution. A component model approach ("Component Model") has been proposed to reuse objects, rather than code as in the Code Model, to the extent possible by treating the code objects as components. This approach would use, for example, Component Object Modeling(COM) paradigm, which is well known in the art, to improve the reusability of defined components. The Component Model, however, is limited in that it requires a substantial amount of reprogramming, much like the Code Model, in order to change the semiconductor manufacturing process. Furthermore, the Component Model requires a programmer to understand COM, which is not generally known. Thus, the Component Model also suffers from high cost due to limited automation process reusability and extensibility. Further, the automation software developed using the Component Model would be limited to a particular piece of equipment. Thus, there would be as many different programs as there are equipment types in a Fab. Still further, it is difficult to maintain and support so many variations of the code.

Various computer architecture and methodologies, separate from the Code and Component Models, have also been used to achieve and improve automation processes. For example, factory automation has moved from a two-tiered client/server architecture to a three-tiered architecture to provide a more efficient automation process. Clients are defined as computational entities that request service resources, while servers are resource entities that respond to service requests. Thus, servers provide services and other resources to clients which consume them.

In a traditional two-tiered client/server architecture, the client communicates directly with one or more database servers or external systems to execute various tasks. The disadvantage of the two-tiered architecture is that either the client or the server contains the business logic, a collection of rules that define the system logic. This reduces the reusability of the client and/or server because, wherever the business logic resides, that portion of the code may not fit into a different business model. Usually, such changes are incompatible with earlier versions of the client, resulting in a fragile application.

These problems with the traditional two-tiered client/server application have been addressed by a three-tiered architecture. The three-tiered architecture partitions the automation process into three logical layers: the user interface layer, the business rules layer and the database access layer. In this architecture, the user interface layer resides on the client. The business logic layer, the database access layer and the database itself reside on the server. The three-tiered architecture makes the application less fragile by further insulating the client from changes in the rest of the application. In other words, the three-tiered client/server architecture reduces application fragility by providing more insulation and separation between layers. The user interface layer communicates only with the business rules layer, rather than the database access layer. The business rules layer, in turn, communicates with the user interface layer on one side and the database access layer on the other. Thus, changes in the database access layer will not affect the user interface layer because the two layers are insulated from each other.

The three-tiered architecture approach is best suited for database applications due to this insulation. However, in a Fab, where services are required to communicate with equipment, as well as other devices and systems, additional tiers are necessary. A need therefore exists for an architecture that incorporates additional tiers for automatic interfacing with semiconductor equipment within the Fab.

In the past, automation processes have used a three-tiered architecture in combination with the Component Model. A configurable state machine was used with reusable components for equipment interface. However, a problem remains in that approach in that one program controlled only one piece of equipment and extensibility was limited because multiple versions of code existed that must all be updated should changes be necessary. Also, changes to a process or equipment often required code level changes that are complicated and time-consuming.

A combination of an object-oriented approach, such as a distributed model, with a multi-tiered architecture approach, has been described by a technology standard for distributed objects known as Common Object Request Broker Architecture (CORBA), developed by a consortium, Object Management Group. In CORBA, clients and servers exist in a distributed environment. Distributed objects are most often deployed in a client/server configuration. Objects may themselves be servers. Rather than differentiate between business logic and data access, the distributed system model simply exposes all functionality of the application as objects, each of which can use any of the services provided by other objects in the system, or even objects in other systems.

CORBA can also blur the distinction between client and server because the client can also create objects that behave in server-like roles. The distributed system architecture thus obtains a high degree of flexibility by encouraging or enforcing the definition of specific component interfaces. The interface of an object specifies to other objects what services are offered by that object and how they are used. As long as the interface of a objects remains constant, that object's implementation can change dramatically without affecting other objects.

In view of the different models, architectures and distributed environments described above, a need exists for a method of automating a microelectronic manufacturing process that avoids the limitations noted above of prior automation processes and that takes advantage of the distributed object model approach. This needed method must permit speedy configuration of new equipment, reusability of the software to reflect changes to the equipment as well as changes to process steps in the manufacturing process, and provide extensibility to the automation process. There also is a need for one software program suite that automates all types of equipment in a Fab to facilitate software revisions and maintenance. A need further exists to use, as part of an automation system, component technology to enhance extensibility.

SUMMARY OF THE INVENTION

The present invention provides a method of automating a microelectronic manufacturing process by configuring an application object that contains the domain knowledge for a piece of equipment. The configuration process is performed by a user in a short amount of time and corresponds to providing characteristics to an automation system of the equipment and external interfaces. After the configuration of the application object has been accomplished, a workflow is implemented by a user by designing the workflow and registering the workflow in a workflow engine. The workflow is designed to represent the manufacturing process. The work flow is then registered in a work flow engine to be executed in order to perform the manufacturing process.

A computer readable medium, having a computer program stored thereon, is also provided so that when the computer program is loaded into a computer system, the computer performs a function of automating a microelectronic manufacturing process by performing the above method. In one embodiment, the computer system is a part of the automation system.

An apparatus is also provided for automating a microelectronic manufacturing process that includes a display device, an interface device and a storage device containing the computer program that performs the method of automating a microelectronic manufacturing process of the present invention. A processing device is also included for executing the computer program.

BRIEF DESCRIPTION OF THE DRAWINGS

The present invention will be described with respect to particular embodiments thereof, and reference will be made to the drawings in which like numbers designate like parts and in which.

DETAILED DESCRIPTION

The present invention relates to a method of automating a microelectronic manufacturing process. While embodiments provided below relate to a method of automating a microelectronic manufacturing process used to manufacture semiconductor devices, it is understood that the method of the present invention may be used to automate any microelectronic manufacturing process to manufacture, for example, flat panel devices, disk drive devices, and the like. Thus, the equipment that is automated in a Fab may be equipment that manufactures and tests semiconductor devices, flat panel displays, disk drives or other microelectronic devices. The present invention relates to the method of automating the manufacturing process rather than the particular type of equipment or manufacturing process being automated.

Figure 1:
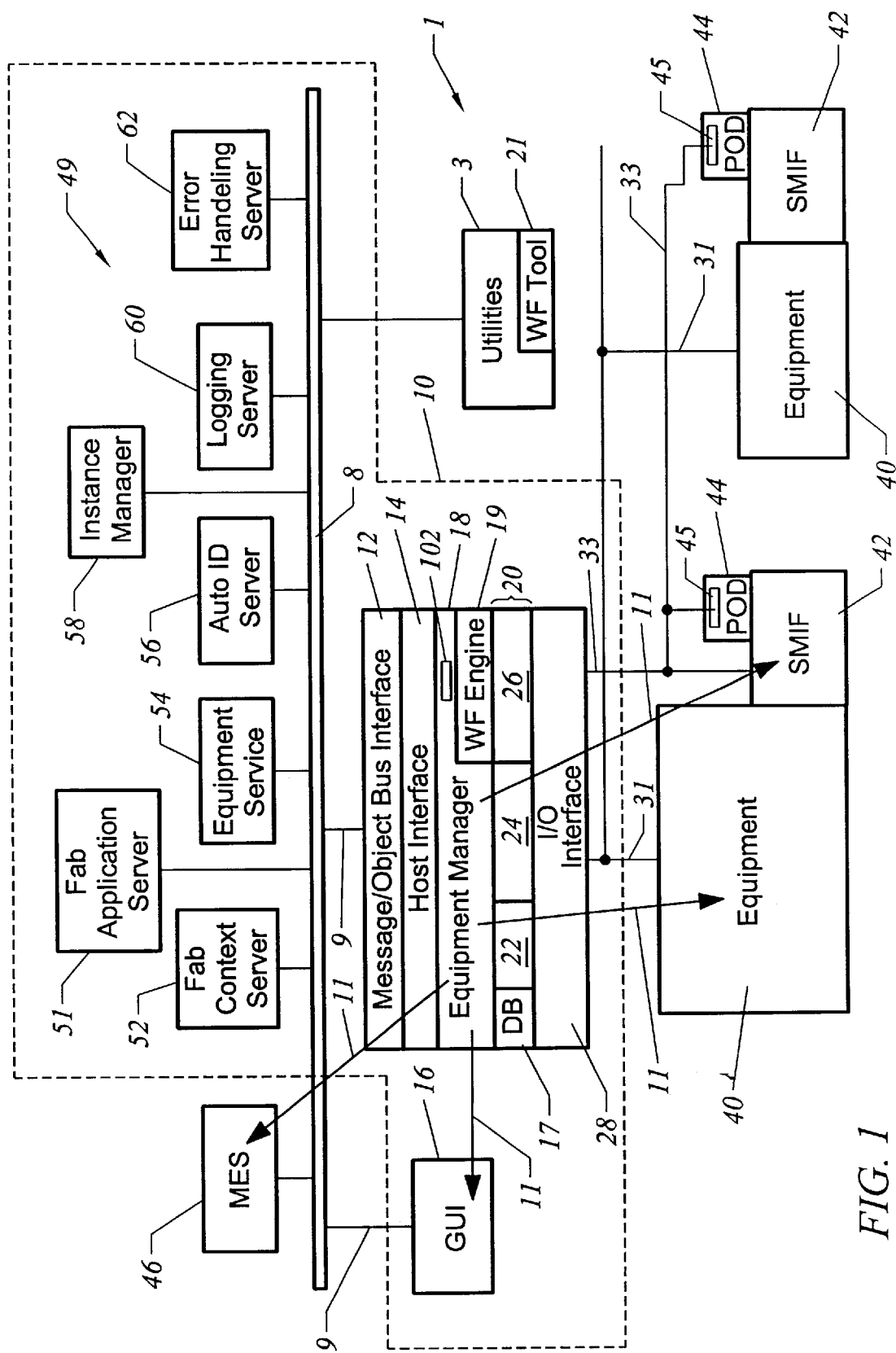
FIG. 1 is a block diagram view of an embodiment of an automation system having a computer program that causes the automation system to perform the method of the present invention.

FIG. 1 is a block diagram view of an embodiment of an automation system having a computer program that causes the automation system to perform the method of the present invention. In FIG. 1, an automation system 1 is shown. It is understood that the automation system 1, in this embodiment, is part of a computer system, such as the computer system of FIG. 8. As such, certain devices that typically comprise a computer system are inferred in FIG. 1, such as a processor, memory, a display, input devices, output devices, audio, other peripherals, mass storage, portable storage and a bus connecting all these devices. A computer program 10 (dashed line) of FIG. 1 includes the objects shown within the dashed line 10. It is understood that the computer program 10 is typically stored on a storage medium (not shown) of an automation system 1 or any computer system such as the computer system of FIG. 8. Thus, the computer program 10 may also be located on a computer-readable medium that includes, but is not limited to, any type of storage disk including floppy disks, optical disks, DVD, CD ROMS, magnetic optical disks, RAMS, EPROM, EEPROM, magnetic or optical cards, or any type of media for storing electronic instructions. In essence, the computer program 10 may be contained within any electronic signal capable of containing the electronic instructions of computer program 10. As such, the computer program 10 may also be communicated through a data network, such as the Internet.

The computer program 10 includes a Message Bus/Object Bus Interface 12, Host Interface 14, Graphical User Interface (GUI) 16, Equipment Manager 18 and component library 20. The component library 20 includes manufacturing equipment interfaces 22, Auto-ID system interface 24, Standard Mechanical Interface (SMIF) component interface 26 and I/O Interface 28. SMIF is a widely known standard which is described in, for example, the publication "The Asyst Technologies SMIF-300 FL 25 Wafer Load Port Demonstration Report," published by International SEMATECH, Technology Transfer #980635294-ENG, hereby incorporated by reference. In one embodiment, these interfaces are in the form of COM components and provide connectivity to the manufacturing equipment 40, SMIF 42, Manufacturing Execution System (MES) 46 and automated material handling systems (not shown). The Message Bus/Object Bus Interface 12 facilitates interface to external decision support systems and supports message passing between objects in the distributed environment of automation system 1 over the Message/Object Bus 8. Utilities 3 contains a workflow development tool 21 and an application object configuration tool (not shown). The I/O Interface 28 is used to communicate with the equipment 40, SMIF 42 and Auto-ID device 45.

The Equipment Manager 18 contains the application objects 51,52,54,56,58,60,62, also referred to as application servers 49. It is noted that these servers are programming objects, rather than hardware servers. In the automation system 1, each step in a sequence used to automate the equipment 40 (typically a semiconductor equipment) is modeled using an object model. The model is derived, in part, by incorporating standards for object models that have emerged from industry standards. The application objects are distributed in the automation system 1 that is, distributed across multiple computer systems, and expose the functionality of the object to other objects or devices in the system 1. Objects can use the services of other objects in the system 1 or objects of other systems. The application objects communicate with one another using an Object Request Broker (ORB) and can be distributed in an environment to support a variety of automation systems. It is understood that other communications means other than ORB, that are commonly known in the industry, such as RPC, DCE, etc., may also be used. It is further understood that a distributed environment exposes all functionality of the computer program 10 as objects throughout the automation system 1. The workflows 102 (FIG. 2) are also part of the Equipment Manager 18 as discussed below. Each object can use any of the services provided by other objects in the automation system 1, or even objects in other systems (not shown). The configuration information are stored in a library to support a wide range of equipment automation. As such, the configuration library provides significant advantages since the information contained in the library may be reused for a variety of equipment automation needs. This library is contained within a configuration database 17 located in the Equipment Manager 18 or the component library 20. It is understood, however, that the database 17 may be located in other portions of the program 10 and that the database 17 may also be stored as a file. When communicating with the computer program 10, the application servers 49 may use configuration tables stored in the configuration database 17. The Equipment Manager 18, through the application servers 49, is able to provide communication paths 11 with the MES 46, GUI 16, equipment 40 and SMIF 42 and other Fab applications to coordinate the automation of the automation system 1.

The computer program 10 includes the application servers 49. These application servers 49, in one embodiment, are contained within the Equipment Manager 18. These application servers 49 are application objects which encapsulate specific domain knowledge related to performing various semiconductor automation tasks such as lot validation, batching, remote commands, Virtual Factory Equipment Interface (VFEI) commands, sequences of VFEI transactions, and the like. Application Servers 49 include, in one embodiment, the Fab Context Server 52, Fab Application Server 51, Equipment Server 54, Auto-ID Server 56, Instance Manager 58, Logging Server 60 and Error Handling Server 62. The Fab Context Server 50 maintains the state information and provides services to hold Fab-wide equipment configuration (ports, chambers, cell, batch, lot, etc.), equipment status and current work in process (WIP) information (lot, wafer, batch, etc.). The Fab Context Server 50 gets updated each time there is a state change in any of the application servers 49. The Fab Context Server 50 posts an event whenever there is a status change or a WIP context change.

The Fab Application Server 51 provides a communication channel to external applications such as MES, Recipe server (not shown) and the like, as well as communicating with other application servers 49. For example, when wafer lots contained in Pod 44 must be loaded in the equipment 40 for processing, the Fab Application Server 51 would send commands to other application servers 49 and MES 46 to accomplish the task. The Equipment Server 54 provides all the necessary services required to interface with the equipment 40 and associated peripheral systems, including highly configurable equipment communication scenarios. The Auto ID Server 56 provides all the necessary services to interface with automatic identification systems, such as the Auto-ID device 45 on Pod 44. An example and explanation of the Auto-ID device 45 is provided in U.S. Pat. Nos. 5,166,884, 4,974,166 and 5,097,421, all of which are herein incorporated by reference.

The Instance Manager 58 manages instances of application servers 49. The Instance Manager 58 is the first server that is activated when computer program 10 is launched. The Instance Manager 58 starts instances of other application servers 49 and provides capabilities to initialize and reset the computer program 10. The Logging Server 60 provides logging and trace services including error messages for all equipment 40 used by the computer program 10. The Logging Server 60 may support multiple levels of detail, depending on the requirements for error message content. It may also provide a catalog file to map error codes to error text description. The Error Handling Server 62 provides services to handle exceptions within the computer program 10, including application exceptions and runtime errors. All the errors may be logged to a file regardless of the severity of the error. The Error Handling Server 62 also may provide all error message windows. It is understood that the various portions of the computer program 10 and automation system 1 communicate through standard communication connections 9, including serial or parallel port communications and network communications (not shown), e.g. TCP/IP.

The Host Interface 14 creates commands communicated to the MES 46 to service a request, generally arriving from the Fab Application Server 51. The Host Interface 14 also interacts with external application servers (not shown). The I/O Interface 28 provides communication interfaces with the equipment 40, SMIF 42 and Auto-ID devices 45. The Equipment Manager 18 further contains a workflow development tool 21 and a workflow engine 19. Workflows 102 (described in FIG. 2) are created and edited using a workflow development tool 21 and are registered using a workflow engine 19 as will be described in more detail below. The MES 46 contains a database having the process data, routes and schedule for an entire Fab.

Outside of the computer program 10 are the equipment 40, SMIF 42, Utilities 3 and Pods 44. The equipment are generally semiconductor manufacturing equipment that are used in a process to manufacture semiconductor devices. It is understood that other semiconductor equipment may also be automated using the method of the present invention, as well as flat panel display manufacturing equipment and disk drive manufacturing equipment, or other microelectronic manufacturing equipment. The equipment 40 uses a SMIF, as are generally known in the industry, to interface with the Pods 44 containing silicon wafers (not shown). The computer program 10 is able to communicate with the equipment 40, SMIF 42 and Auto-ID device 45 to perform the method of the present invention. Semiconductor Equipment Communication Standard (SECS) 31,33 is an industry standard communication protocol for transmitting information between equipment and automation systems. SECS 31 communicates with equipment 40. SECS/Auto-ID 33 communicates with an Auto-ID device 45 that is able to locate and identify wafer lots in a Pod 44. SECS/Auto-ID is, in one embodiment, a proprietary communication protocol, that may not include SECS standard protocol. SECS 31 may communicate through serial ports with the equipment or a network communication (not shown), e.g. TCP/IP. The operation of the automation system 1 of FIG. 1 shall be described below in relation to FIG. 2.

Figure 2:
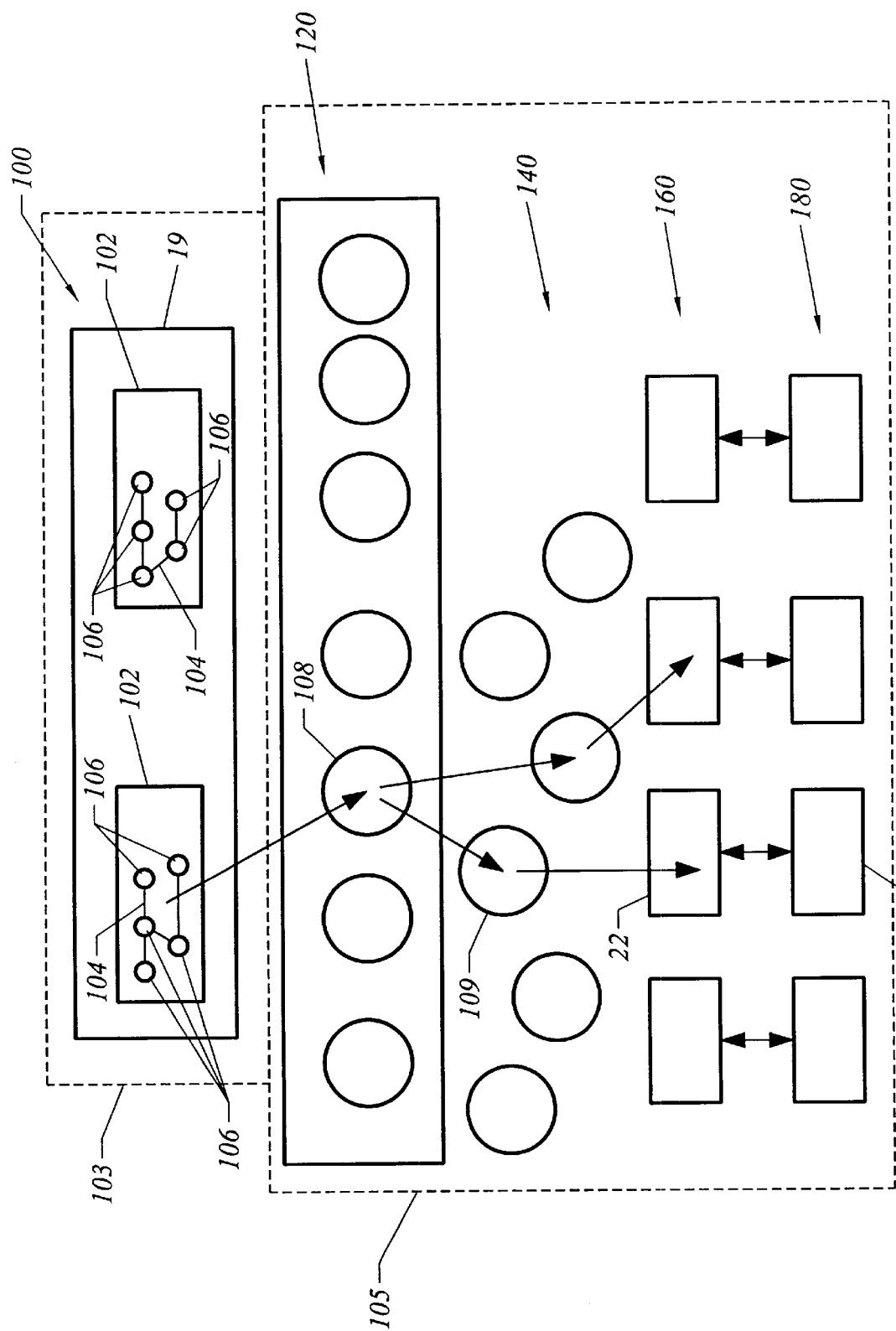
FIG. 2 is a block diagram view of an n-tiered architecture of the computer program of FIG. 1.

FIG. 2 is a block diagram view of an n-tiered architecture of the computer program of FIG. 1. In FIG. 2, five tiers 100,120,140,160,180, or layers, are shown. It is understood that while FIG. 2 shows five tiers or layers, alternative embodiments contain more or less tiers, or n-tiers. While the number of tiers is not important, it is important that the number of tiers be sufficient to enable the top tier to communicate, directly or indirectly (through other tiers), with the lowest tier. It is also important that the highest architectural tier 103 (dashed line) is the tier that a user interacts with. This is unlike the lower architectural tier 105 (dashed line) that a user does not interact with. A user does not create the code that is the base of the computer program 10 (a programmer performs this function), but instead only uses the program 10 to automate a Fab. This creates a significant advantage since a user needs only to interact with the highest architectural tier 103 containing the workflow 102. This is much simpler for a user than to interact with code in the lower architectural tier 105. Speedy automation of equipment and the manufacturing process therefore results. The tiers represent levels of objects in the computer program 10 of FIG. 1, with the workflow layer 100 being the layer that a user of the automation system 1 needs to interface with.

The workflow layer 100 is the top layer and represents the semiconductor manufacturing process. For example, a standard operating procedure (SOP) can be represented as a workflow 102. Workflows are composed of activities 106 that are linked in meaningful ways, such as a sequence of a manufacturing processes, by routers 104. Router 104 may be represented internally as a conditional statement as is well known in the art. Likewise the workflows 106 may be represented to a user graphically, through a script, or by a sequence of messages. Workflows 106 may be created or modified by manipulating a graphical user interface (GUI) to lay out activities and sub-processes as a series of connected activity objects. The workflow layer 100 is designed and modified by the user and interacts with the activity layer 120. The workflow layer 100 is the layer that a user of the automation system of FIG. 1 interacts with. The remaining layers (lower architectural tier 105) are instantiated by the computer program 10 upon executing a workflow as described below. Thus, a user needs not interact with the lower architectural tier 105.

The activity layer 120 comprises a collection of activity clients 108 which are available to the GUI 16 that a user manipulates, at the workflow level, to design and modify workflows 102. The activity clients 108 may execute one or more activities 106 when a workflow engine 19 (FIG. 1) delegates the activity 106. The activity clients 108 are the variations of Fab Application Server 51. Activity clients 108 invoke specific methods on the Application Servers 49 (FIG. 1) to accomplish a specific activity 106 as part of the execution of a workflow 102.

The application servers 49 make up the Object Layer 140. The application objects 109 are the same as the application servers 49 of FIG. 1. The application servers 49 make calls to the Interface Layer 160 which include the component library 20 (FIG. 1). The interfaces such as 22, 24 and 26 in turn communicate with devices in the physical layer 180 such as equipment 40, SMIF 42 or Auto-ID device 45.

Figure 3:
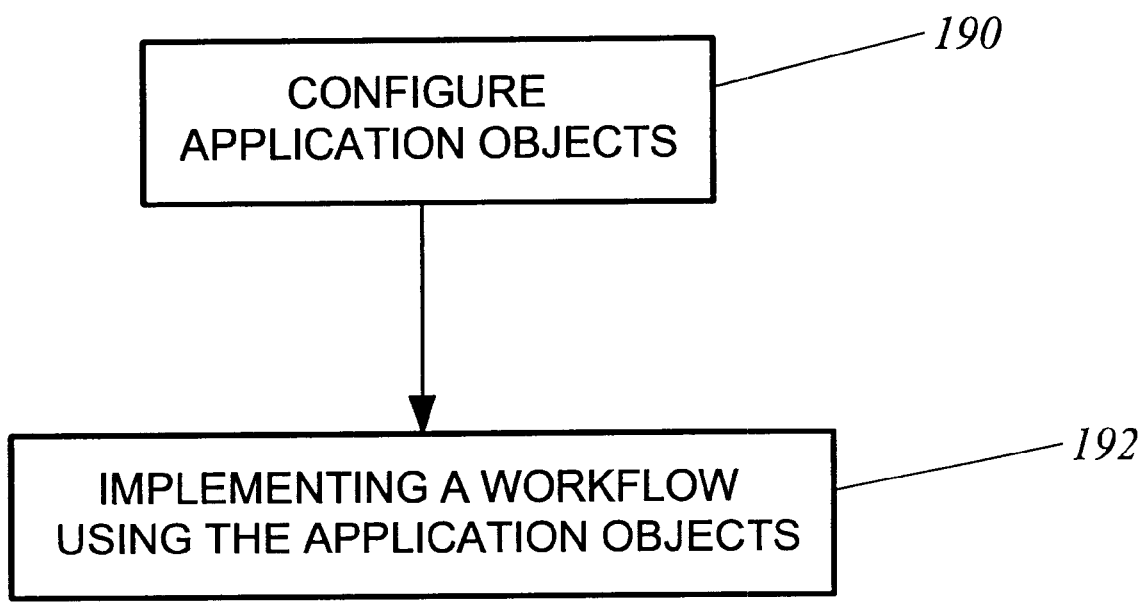
FIG. 3 is a flow chart of the method of the present invention.

The computer program 10 (FIG. 1) having the architecture of FIG. 2 causes a computer system, or the automation system having a computer system of FIG. 1, to perform the method of the present invention. The method of the present invention is shown in FIG. 3. FIG. 3 is a flow diagram view of the method of the present invention. The method of the present inventions begins at the first step 190 by configuring the application objects (application servers 49 of FIG. 1). Configuration is a process of providing characteristics of the equipment 40, SMIF 42 and Auto-ID device 45 (generally referred to as equipment) to the computer program 10. Specifically, the configuring step 190 is performed by a user entering the characteristics of the equipment and storing that characteristic information in configuration database 17 (FIG. 1). Configuration is generally performed once for a piece of equipment in a Fab. A user interfaces with the computer program 10 through a display. The display will provide to the user a list of Virtual Factory Equipment Interface (VFEI) commands. Since the equipment has been already been characterized at this point, the configuration captures the variations in the tools using these VFEI commands. The VFEI commands are generally known in the industry and publically available, in for example, the publication "Virtual Factor Equipment Interface:Version 2:2", SEMATECH Technology Transfer 95113016A-TR, hereby incorporated by reference.

Configuration also includes providing commands for the MES 46 and Host Interface 14 which is used automatically by the application objects 109 when executing the commands issued by Fab Application Server 51 (activity client 108). For example, when a LOAD command is executed by application objects 109, the configuration information stored in configuration database 17 indicates to the application object 109 the equipment specific details associated with executing the LOAD command. Likewise, the configuration database 17 further provides MES and other host specific commands. For example, a TRACKIN command sent to the MES 46 would require a user to provide LOTID, EQUIPID, RECIPE ID, USERNAME, AND WAFERCOUNT to the MES which would, in turn, obtain the values for these items from the Context Server 52. In essence, the configuration provides all domain knowledge, i.e. all possible variations for a particular command supported by the application object 109, in the manufacturing process.

In one embodiment, a user configures the application object by performing the following substeps. The configuring step of the method of the present invention includes the steps of a user interfacing with the computer system to provide equipment information, storing the equipment information in a database configuration table, interfacing with the computer system to provide activity information, interfacing with the computer system to provide virtual factory equipment interface commands for the activity information, interfacing with the computer to provide manufacturing execution system parameters to the computer system and interfacing with the computer system to provide an event that activates the work flow. Events are defined as, in one embodiment, Pod arrival event, a main batch control start event, a main batch control complete event and a Pod removal event.

Once the configuring step 190 is complete, the second step 192 of implementing a workflow using the application objects is performed. In step 192, a user performs two further steps. First, the user designs one or more workflows 102 using GUI 16. Second, the user registers the workflow 102 with the workflow engine 19. A user registers a workflow 102 by labeling the workflow 102 with a unique identifier. An application server 49 may instantiate any workflow 102. registered with the workflow engine 19. Based on the attributes and rules specified by the individual activities 106 in the workflow 102, the workflow engine 19 presents each activity request to an activity client 108. The activity client 108 collects and composes all the information needed from the configuration database 17 and invokes one or more application servers 49 to fulfill the activity request. The activity client 108 then invokes one or more methods on one or more application objects 109 to fulfill the activity. The application objects 109 may invoke methods on other servers and/or make calls to interface components 22,24,26. The interface components 22,24,26 interact with the physical systems or external application and perform the specific task assigned by the application object 109. Upon completion of the tasks, the application objects 109 perform the relevant application logic and notify the activity client 108 of the completion or other termination of the activity along with any attributes that are needed. The workflow engine 19 then changes the state of the activity 106 to complete and after evaluating the router logic proceeds to the next activity.

Figure 8:
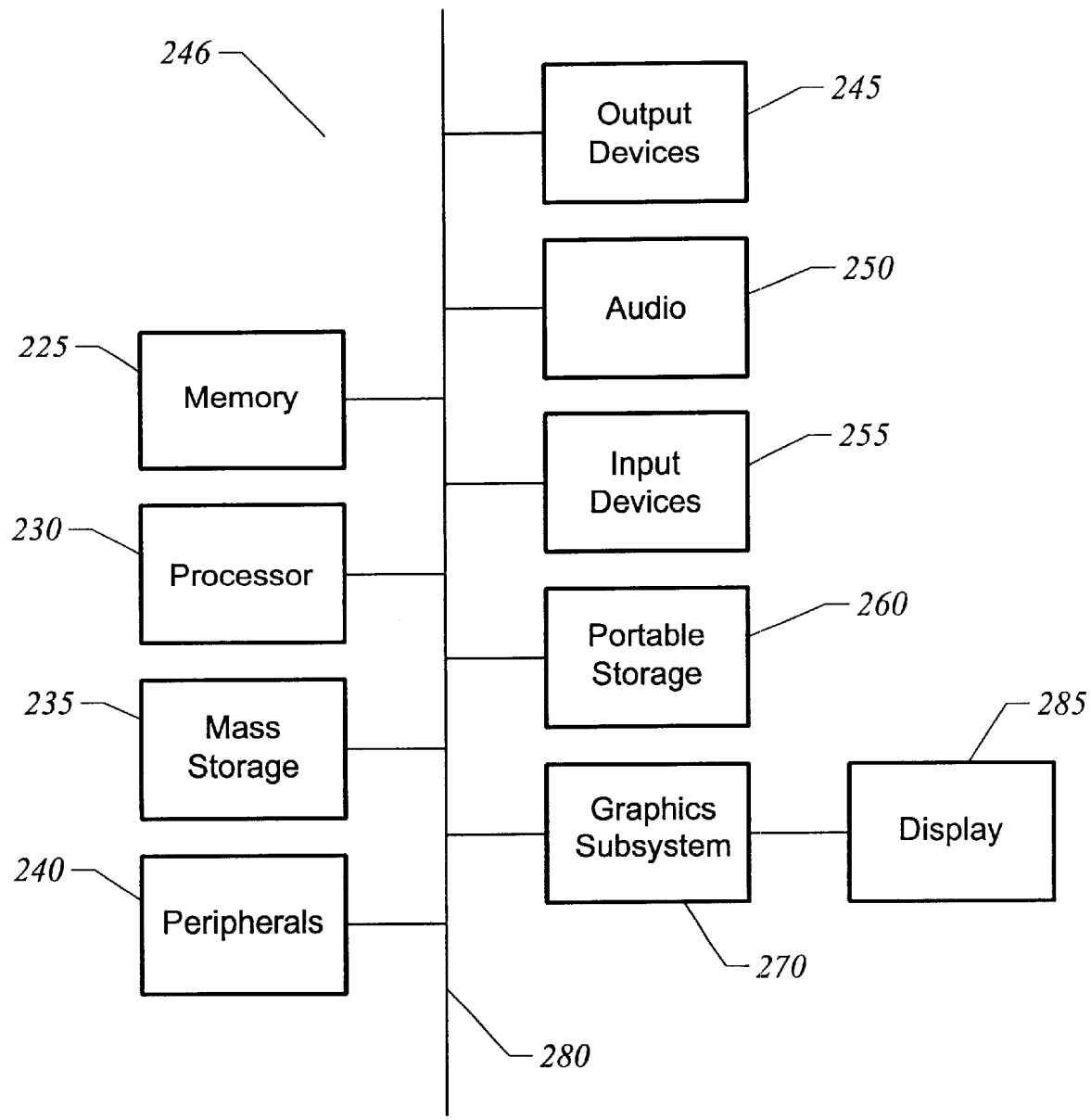
FIG. 8 is high-level block diagram view of an embodiment of a computer system having a computer program that causes the computer system to perform the method of the present invention.

The implementing step of the method of the present invention further comprises the steps of interacting with the workflow by designing the workflow using a computer system, such as the computer system of FIG. 8, where the computer system has a computer program that contains a higher architectural tier (work flow 19, 100 of FIG. 2, and a lower architectural tier (tiers 120, 140, 160, 180 of FIG. 2. The user interacts with the highest architectural tier 103, that is the work flow 19, 100, to implement a standard operating procedure for the microelectronic manufacturing process. In a further embodiment, the designing step of designing the workflow by a user is performed by a user choosing an activity to perform in the microelectronic manufacturing process and then placing the activity into the workflow to provide the sequence of steps of the microelectronic manufacturing process.

The operation of the automation system of FIG. 1, in conjunction with the computer program 10, is as follows. It is understood that the operation of the embodiment of the automation system 1 of FIG. 1 is one example of the operation of many automation systems that may incorporate the computer program that causes the automation system to perform the method of the present invention as claimed below. The computer program 10 of the automation system 1 may be practically implemented in a semiconductor manufacturing facility in order to automate such facility. Specifically, such a computer program 10 is practically implemented in a computer system (e.g. general purpose computer such as shown in FIG. 8) that may be a part of the automation system of FIG. 1. The semiconductor manufacturing facility is performing a semiconductor manufacturing process by processing silicon wafers using equipment. The wafers are grouped in lots and transported in cassettes within pods to a SMIF attached to the equipment (in another embodiment, SMIF need not be used). As the wafers are processed throughout the facility, the automation system is operated to automate events that occur. When an event occurs, such as a cassette arrival, a workflow 102 is triggered and workflow 102 is executed. The workflow engine 19 executes each activity 106 in a sequential manner as defined by the routers 104. The workflow engine 19 is an object that executes workflows defined by a user. Thus, once a user has configured the application objects and implemented the workflow, the automation system is able to handle the semiconductor manufacturing process.

There are significant advantages of the present invention. The present invention provides configurable and reusable application objects along with equipment-type specific workflow that provides a close-fitting equipment automation for all types of equipment. This has advantages over prior art systems because prior art systems had significant drawbacks in that the prior systems needed to develop 40 to 60 separate custom built code releases to support each piece of unique equipment. This required significant development and release effort and a significant maintenance problem. If a Fab did not have 40 to 60 unique software automation, the Fab needed to develop one giant code which could be configured to fit different types of equipment, but the resulting giant code had to be extensively tested on all existing equipment every time the code changed. This again entailed significant cost and time penalties in terms of development, testing, release, configuration management and maintenance.

The method of the present invention also separates the activity execution logic from the activity sequencing. That is, to implement automation standard operating procedures for different types of manufacturing equipment, it is only required that the activities (the building blocks) are available as a library of pre-tested components, to be sequenced appropriately by a workflow for each type of equipment. This results in no changes to the code in the lower architectural tier and associated regression testing, certification, and configuration management every time the code changes. An automation user therefore simply uses the activities without needing to touch the implementation code. Only one version of the implementation code is required for all manufacturing equipment types. Thus, this results in maintaining only one set of automation code versus the 40 to 60 sets of code required in the prior art which results in lower cost of testing, shorter cycle time to release new enhancements and fix problems, and higher reliability and lower regression testing due to repeated re-use of activities across different equipment types. The method also provides the benefit of built-in isolation between component usage and component implementation (in application objects) for proper project management where component users do not meddle with implementation code which otherwise requires costly test and certification cycle as well as associated document control. The method further provides direct mapping of standard operating procedure requirements to workflow activities without requiring costly effort to validate requirements within internal code implementation. Furthermore, unlike conventional automation schemes, such as state machine transition diagrams which are used for small to medium automation needs, the present system works for large systems.

Additional advantages exist in the method described above of automating the microelectronic manufacturing process. The method replaces the extensive amount of reprogramming of previous automation systems by capturing as many variations as possible in a semiconductor manufacturing process up front and thereby making any changes to the manufacturing process a simple procedure through configuration. That is, in the past, a programmer had to include all variations in the semiconductor manufacturing process while automating the Fab and any changes to the process required extensive reprogramming. Now, all variations are already provided as part of the application objects so the process for automating the Fab is greatly simplified. Accordingly, the costs associated with reprogramming and downtime of equipment have been reduced significantly.

These advantages translate into tremendous benefits in a semiconductor manufacturing process. The automation system fully automates the operation of a semiconductor fabrication processing and metrology equipment. The automation system automates standard operating procedures for processing wafers and assures that the correct lot is processed with the correct equipment with the correct processing recipe. The system coordinates the MES, the fabrication equipment, and interfaces using SMIF and the Auto-ID devices to achieve rapid, error-free processing. The system eliminates having to wait for manual transaction by implementing "fite and forget" operation. The system allows for efficient equipment and resource utilization and uses distributed objects for automating semiconductor manufacturing processes. The system design makes possible the rapid configuration and employment of equipment automation solutions for the entire fabrication system. The system is supported by an extensive library of completed equipment interfaces, workflows and activities. The system further provides a user the ability to review equipment status through a data network such as the Internet or an Intranet.

The system is available in fault tolerant, high availability configurations and is ready for expandability for larger semiconductor wafers such as 300 mm wafers.

Figure 4:
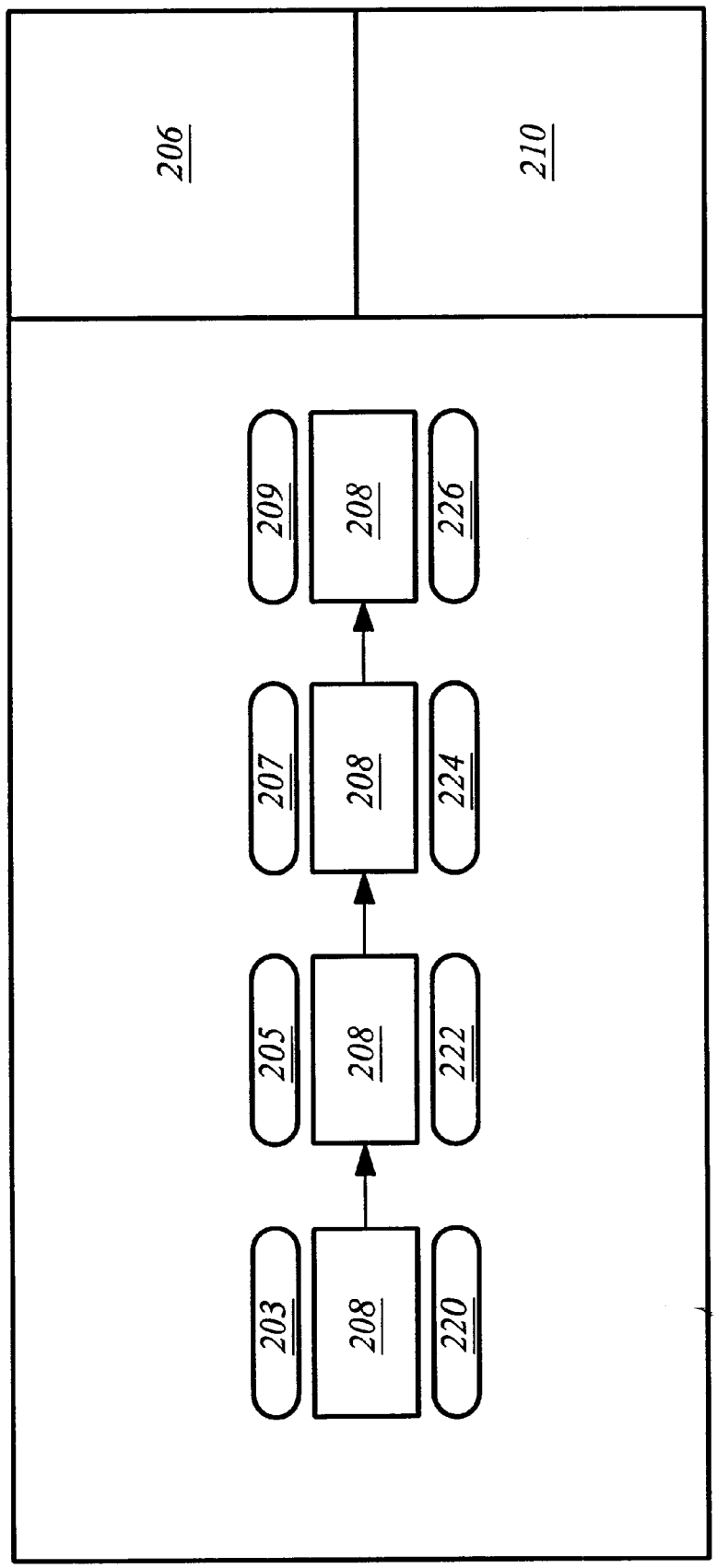
FIG. 4 is a block diagram view of an embodiment of a workflow used in the computer program of FIG. 1.

FIG. 4 is a block diagram view of an embodiment of a workflow used in the computer program of FIG. 1. Workflows 102 are created and edited using a workflow development tool 21 (FIG. 1). The workflow development tool 21 is a graphical user interface that allows a user to construct diagrams that represent definitions of individual workflows 102. Workflow definitions link together activities 108 (FIG. 2) in the specific sequences required to implement automation for a particular piece of equipment. Workflow templates may be provided for a wide variety of equipment. As a result, the task of developing software to implement automation is reduced in most cases to configuring the application objects in the configuration database 17 and, if necessary, modifying the workflow. As shown in FIG. 4, each activity in a workflow may be represented by a block 208 and some surrounding text. such representation is thus in graphical form. It is understood, however, that this is only one form of representing the workflow and other forms may also be used including script and a sequence of messages. Boxes 208 are created by a user on an interface to a computer system. Activities are selected from activity window 206 and dropped into boxes 208. Activity names 220, 222, 224, 226 and 203, 205, 207, 209 are provided by a user through an interface such as a dialog box. Process parameters are shown in process parameter window 210. As shown, the workflow definition begins with activity 220, wherein, for example, a Pod 44 is locked by a SMIF 42 on a particular piece of equipment 40. In activity 222, the SMIF 42 reads the Auto-Id device 45 on the Pod 44. Control continues to activity 224, where lot equipment validation is performed on the host/MES. Host Interface 14 (FIG. 1) performs lot equipment validation, where the equipment is verified as. correct for the particular fabrication process to be performed on the lot of wafers. Control of the workflow continues to activity 226, where the operator GUI 16 is used to perform operator validation (i.e. through password or barcode validation). Activities continue until the workflow is executed to completion.

Once the user is satisfied with the workflow definition constructed with the workflow development tool 21, the workflow may be saved in the configuration database 17. It is understood that the database 17 may be distributed anywhere throughout the automation system 1. After registering the workflow with the workflow engine 19, an event, such as placing a pod 44 on the SMIF 42 connected to the manufacturing equipment 40, will trigger the execution of the workflow illustrated in FIG. 4.

Figure 5:
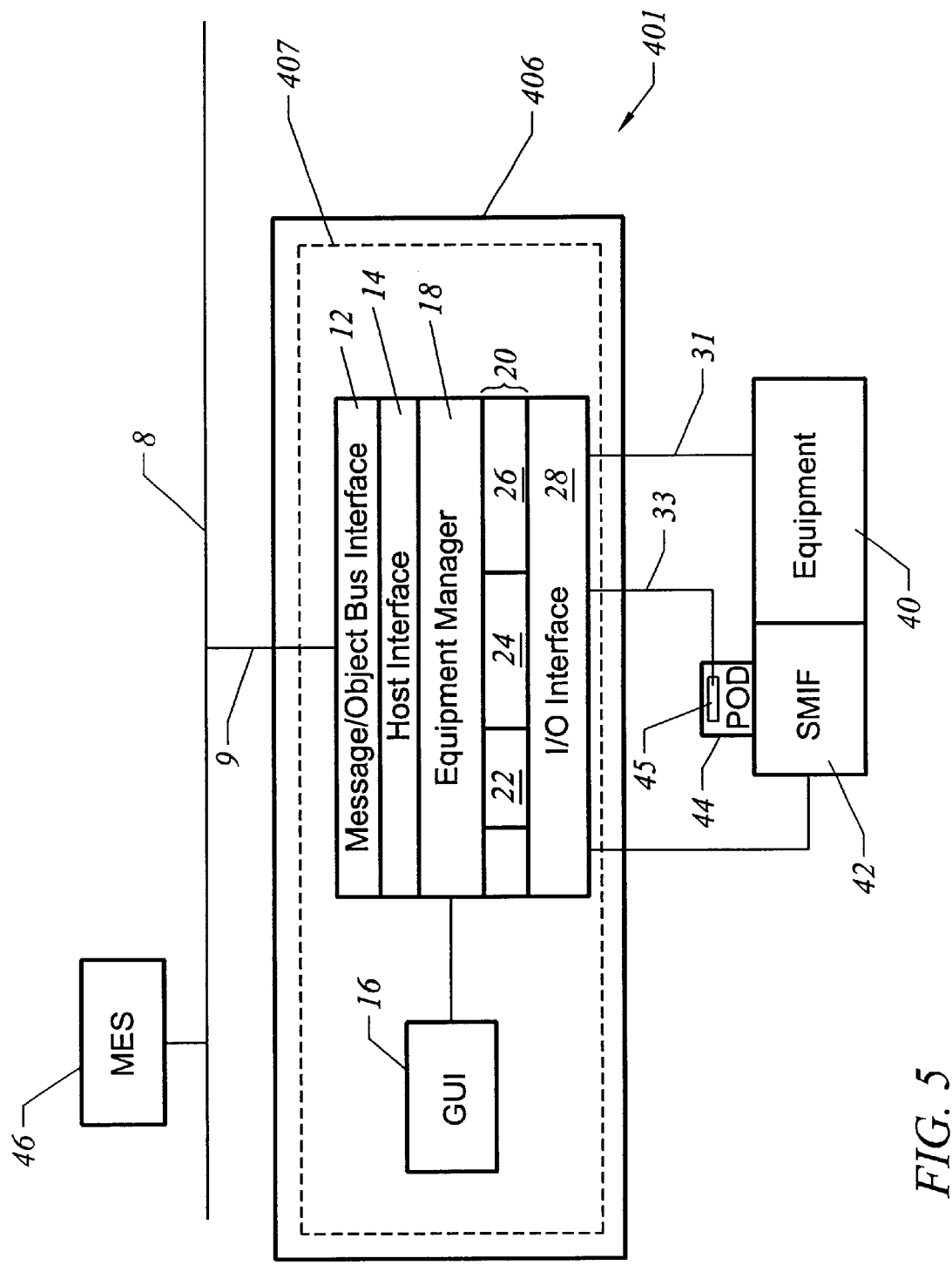
FIG. 5 is block diagram view of another embodiment of an automation system having the computer program that causes the automation system to perform the method of the present invention.

FIG. 5 is block diagram view of another embodiment of an automation system having the computer program that causes the automation system to perform the method of the present invention. This embodiment has similar elements to the embodiment of FIG. 1. In this embodiment, the automation system 401 has a computer program 406 that is used to automate one piece of equipment 40, one SMIF 42 and one Auto-ID device 45. The computer system 407, that contains memory (not shown) to store the computer program 406, a processor (not shown) to execute the computer program 406 and a display (not shown) to interface with the computer system 407, is physically located near the semiconductor equipment 40. The computer system 407 is intended to incorporate the general devices of a computer system as shown in FIG. 8.

Figure 6:
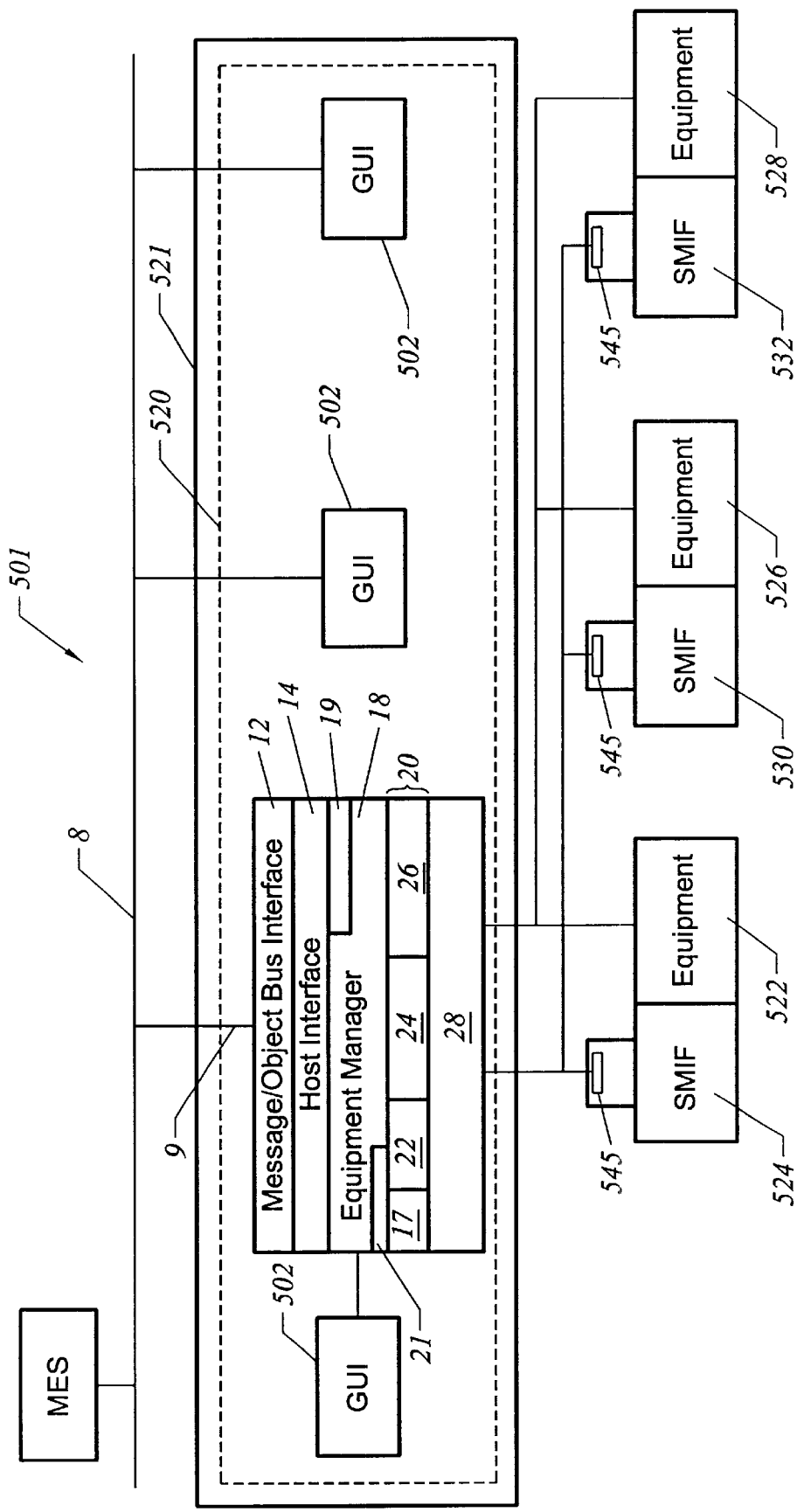
FIG. 6 is a block diagram view of a further embodiment of an automation system having the computer program that causes the automation system to perform the method of the present invention.

FIG. 6 is a block diagram view of a further embodiment of an automation system having the computer program that causes the automation system to perform the method of the present invention. Like FIG. 5, the automation system of FIG. 6 is similar to the automation system of FIG. 1, with the essential difference being there are multiple equipment 522, 526, 528 as well as multiple SMIF interfaces 524, 530, 532 that are controlled by a computer system 521 having multiple GUI 502. Likewise, multiple Auto-ID devices 545 are also controlled by computer system 521 and computer program 520. The multiple GUI provide the advantage of multiple accessibility throughout the Fab to the automation system. As with FIG. 51 the automation system 501 of FIG. 6 shows only part of computer system 521 with the remainder of computer system 521 shown in FIG. 8 below.

In further embodiments, different GUI's may be seamlessly integrated into the automation system of FIG. 6. For example, the computer program 520 can also incorporate displays developed in the form of ActiveX controls. Additional GUIs can be developed using COM servers using Visual C++ or Visual Basic, or built-in capabilities of the computer program display client. This display client allows the user to customize predefined template screens for tasks such as operator validation, scrap, air display, and diagnostics. The computer program 520 controls the presentation of displays to the user. Once the displays have been developed, they can be incorporated as elements of the workflow (FIG. 2). The GUI also provides additional functions including an operator interface for the automation system for displaying dynamic states of the computer program; a manual operation mode for the SMIF input-output, including load, unload, read, Auto-ID device, initialize Auto-ID device, home, etc. This mode allows for error recovery and other operations. The GUI also provides a display of equipment specific and process specific data from the MES or other application servers being used. Direct connection to the MES or other application servers is also provided by the GUI. The embodiment of FIG. 6 has the computer system 520 that is physically located close to the equipment 522, 526, 528, as well as the SMIF 524, 530, 532 in the semiconductor fabrication. The computer system 520 may also be located in a remote location from the equipment 522, 526, 528.

Figure 7:
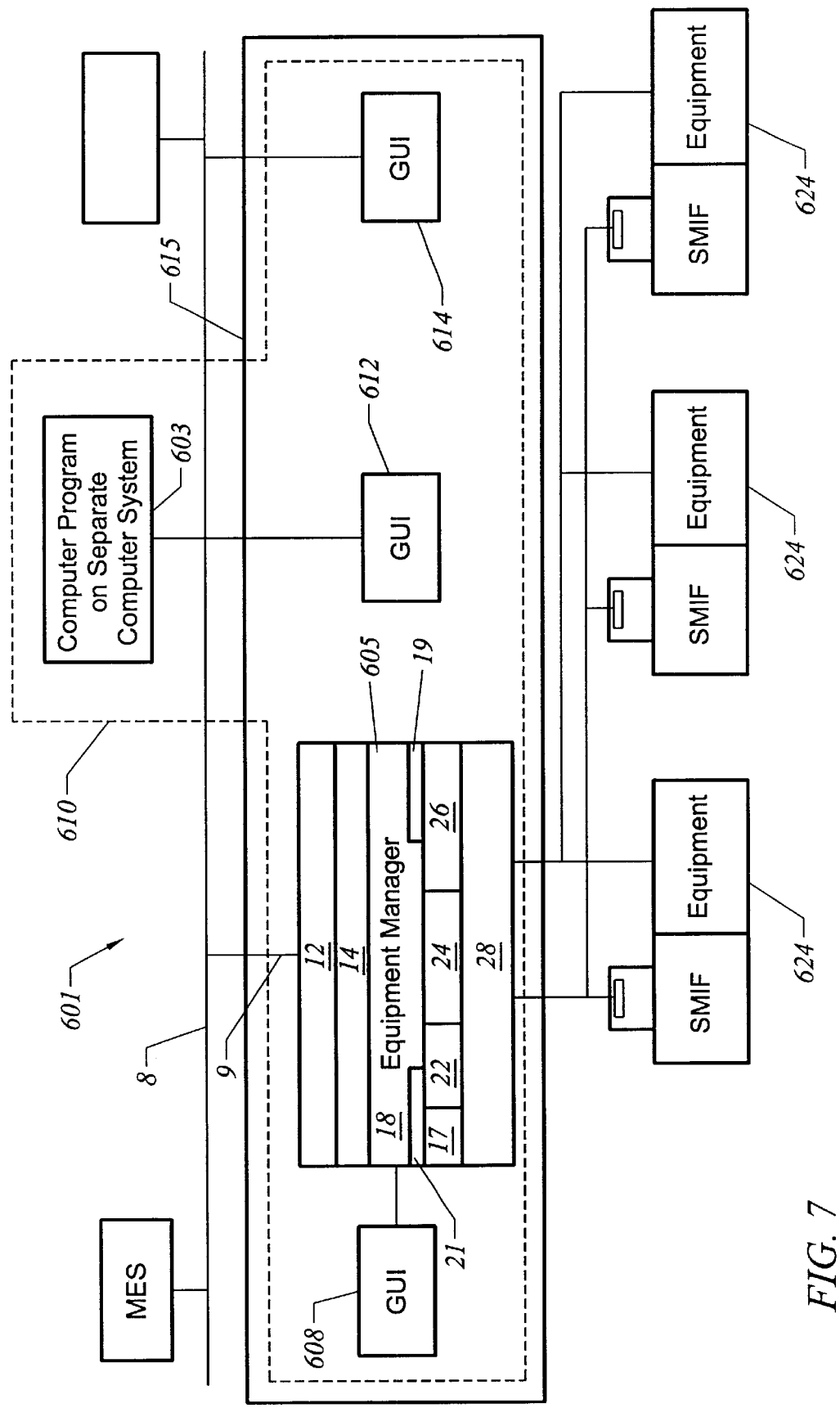
FIG. 7 is a block diagram view of a still further embodiment of an automation system having the computer program that causes the automation system to perform the method of th present invention.

FIG. 7 is a block diagram view of a still further embodiment of an automation system having the computer program that causes the automation system to perform the method of the present invention. The automation system 601 of FIG. 6 has a fully distributed computer program 610 (dashed line). The automation system 601 is considered fully distributed since the computer program 10 of FIG. 1 is divided into discrete programs 603, 605. These discrete programs may be located on separate computer systems located throughout an automation system 601. Thus, the automation system 601 can separately run, for example, the workflow, activity clients and the interface components on different computer systems from another computer system that runs the application objects, the activity clients and the configuration database. Essentially, this embodiment permits the division throughout the automation system 601 of the computer program 610. The system 601 may be configured for full hardware and software failover and load balancing. The benefit of the system 600 is that the resource requirements on the GUI stations 608, 612, 614, and the computer system 615 will be reduced. Furthermore, the GUI 608, 612, 614 for each of the equipment 624 is on a separate computer system. The automation system of FIG. 7 otherwise is similar in elements and operation to the embodiment of FIG. 1.

FIG. 8 is high-level block diagram view of an embodiment of a computer system having a computer program that causes the computer system to perform the method of the present invention. The computer system 246 of FIG. 8 includes a processor 230 and memory 225. Processor 230 may contain a single microprocessor, or may contain a plurality of microprocessors for configuring the computer system as a multi-processor system. Memory 225, stores, in part, instructions and data for execution by processor 230. If the system of the present invention is wholly or partially implemented in software, including a computer program, memory 225 stores the executable code when in operation. Memory 225 may include banks of dynamic random access memory (DRAM) as well as high speed cache memory.

The system of FIG. 8 further includes a mass storage device 235, peripheral device(s) 240, input device(s) 255, portable storage medium drive(s) 260, a graphics subsystem 270 and a display 285. For purposes of simplicity, the components shown in FIG. 8 are depicted as being connected via a single bus 280. However, the components may be connected through one or more data transport means. For example, processor 230 and memory 225 may be connected via a local microprocessor bus, and the mass storage device 235, peripheral device(s) 240, portable storage medium drive(s) 260, and graphics subsystem 270 may be connected via one or more input/output (I/O) buses. Mass storage device 235, which is typically implemented with a magnetic disk drive or an optical disk drive, is a non-volatile storage device for storing data and instructions for use by processor 230. In another embodiment, mass storage device 235 stores the computer program implementing the method of automating a microelectronic manufacturing process for purposes of loading such computer program to memory 225. The method of the present invention also may be stored in processor 230.

Portable storage medium drive 260 operates in conjunction with a portable non-volatile storage medium, such as a floppy disk, or other computer-readable medium, to input and output data and code to and from the computer system of FIG. 8. In one embodiment, the method of the present invention for automating a microelectronic manufacturing process is stored on such a portable medium, and is input to the computer system 246 via the portable storage medium drive 260. Peripheral device(s) 240 may include any type of computer support device, such as an input/output (I/O) interface, to add additional functionality to the computer system 246. For example, peripheral device(s) 240 may include a network interface card for interfacing computer system 246 to a network, a modem, and the like.

Input device(s) 255 provide a portion of a user interface. Input device(s) 255 may include an alpha-numeric keypad for inputting alpha-numeric and other key information, or a pointing device, such as a mouse, a trackball, stylus or cursor direction keys. Such devices provide additional means for automating a microelectronic manufacturing process in the method of the present invention. In order to display textual and graphical information, the computer system 246 of FIG. 9 includes graphics subsystem 270 and display 285. Display 285 may include a cathode ray tube (CRT) display, liquid crystal display (LCD), other suitable display devices, or means for displaying, that enables a user to interact with the computer program to configure the application objects and implement the workflows. Graphics subsystem 270 receives textual and graphical information and processes the information for output to display 285. Display 285 can be used to display an interface to interact with the computer program to configure the application objects and implement the workflows and/or display other information that is part of a user interface. The display 285 provides a practical application of the method of automating a microelectronic manufacturing process since the method of the present invention may be directly and practically implemented through the use of the display 285. The system 246 of FIG. 9 also includes an audio system 250. In one embodiment, audio system 250 includes a sound card that receives audio signals from a microphone that may be found in peripherals 240. Additionally, the system of FIG. 8 includes output devices 245. Examples of suitable output devices include speakers, printers, and the like.

The devices contained in the computer system of FIG. 8 are those typically found in general purpose computer systems, and are intended to represent a broad category of such computer components that are well known in the art. The computer system of FIG. 8 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

Alternative embodiments of the use of the method of the present invention in conjunction with the computer system 246 further include using other display means for the monitor, such as CRT display, LCD display, projection displays, or the like. Likewise, any similar type of memory, other than memory 225, may be used. Other interface means, in addition to the component interfaces, may also be used including alpha-numeric keypads, other key information or any pointing devices such as a mouse, trackball, stylus, cursor or direction key.

The computer program of the present invention provides for equipment automation using the rapid configuration and support of the extensive library of the application objects as well as the implementation of the workflow technique. The automation system is also expandable to provide a software suite that includes monitoring and control of all the relevant aspects of temporary material storage. In one embodiment, the storage protocol automatically updates the MES with the real time location of WIP and simplifies a staging process by using a configurable GUI that displays lot and intelligent data information. An operator can use the storage protocol to search for lots according to any information stored in an Auto-ID device. Lots can be sorted and filtered by lot ID recipe next process step last process step priority, equipment ID and operator ID. The automation system, and software suite, is also expandible to further provide for material location tracking in order to track a physical location of all lots in the fab whether the lots or at an equipment or on a storage rack.

Numerous modifications and variations of the present invention are possible in light of the above teachings. It is therefore to be understood that within the scope of the attended claims, the invention may practice otherwise and specifically described herein.

What is claimed is:

1. A method of automating a manufacturing process, said method comprising the steps of:
    providing an application object, the application object implementing a domain knowledge for equipment used in the manufacturing process; and
    implementing a workflow using the application object, the workflow representing a sequence of steps of the manufacturing process.

2. The method of claim 1, wherein said implementing step is performed by a user of the manufacturing process.

3. The method of claim 2, wherein said implementing step further comprises the step of:

interacting with the workflow by designing the workflow using a computer system, the computer system having a computer program containing a highest architectural tier and a lower architectural tier for automating the manufacturing process, the user interacting only with the highest architectural tier, the highest architectual tier containing the workflow to implement a standard operating procedure for the manufacturing process.

4. The method of claim 3 wherein said computer program further includes:

a second highest architectural tier having an activity client;

a third highest architectural tier having an application object, said application object operable to be invoked by said activity client; and a fourth highest architectural tier having an interface component, said interface component in communication with said application object and said lower architectural tier.

5. The method of claim 1, wherein the manufacturing process is a process for manufacturing a semiconductor device.

6. The method of claim 1, wherein the manufacturing process is a process for manufacturing a flat panel display device.

7. The method of claim 1, wherein the manufacturing process is a process for manufacturing a disk drive device.

8. The method of claim 1, wherein said providing step further comprises the steps of:

interfacing by a user with a computer system to provide equipment information;

storing the equipment information in a database configuration table;

interfacing by the user with the computer system to provide an activity information;

interfacing by the user with the computer system to provide virtual factory equipment interface commands for the activity information;

interfacing by the user with the computer to provide manufacturing execution system parameters to the computer system; and interfacing by the user with the computer system to provide an event that activates the workflow.

9. The method of claim 8, wherein the event is selected from a group consisting of a pod arrival event, a main batch control start event, a main batch control complete event and a pod removal event.

10. The method of claim 1, wherein the implementing step further comprises the steps of:

designing the workflow by a user; and registering the workflow using a workflow engine.

11. The method of claim 10, wherein said designing step further comprises the steps of:

choosing an activity to be performed in the manufacturing process; and placing the activity into the workflow to provide the sequence of steps of the manufacturing process.

12. A computer readable medium having a computer program stored thereon, that, when loaded into a computer, causes the computer to perform a function of automating a manufacturing process, the computer automating the manufacturing process by performing the steps of:

providing an application object, the application object implementing a domain knowledge for equipment in the manufacturing process; and implementing a workflow using the application object, the workflow representing a sequence of steps of the manufacturing process.

13. An apparatus for automating a manufacturing process, comprising:

a storage device, said storage device containing a computer program for automating the process by performing the steps of:

providing an application object, the application object implementing a domain knowledge for equipment in the manufacturing process; and implementing a workflow using the application object, the workflow representing a sequence of steps of said microelectronic manufacturing process;

a display device for interfacing with the computer program;

an interfacing device for interfacing with the computer program; and a processing device for executing said computer program.

14. A method of automating a manufacturing process, the method comprising the steps of:

providing an equipment characteristic to implement a domain knowledge for equipment used in the manufacturing process; and implementing a workflow, the workflow representing a sequence of steps of the manufacturing process.

15. The method of claim 14, wherein said implementing step is performed before said configuring step.

16. The method of claim 14, wherein said configuring step further comprises the step of configuring an application object, the application object using the equipment characteristic to implement the domain knowledge.

17. The method of claim 14, wherein said configuring step is performed before said implementing step.

18. The method of claim 14, wherein the workflow is represented graphically to a user.

19. The method of claim 14, wherein the workflow is represented to a user by a script.

20. The method of claim 14, wherein the workflow is represented to a user by a sequence of messages.

21. An electronic signal comprising a computer program wherein the electronic signal contains instructions that perform a method for automating manufacturing process, the method comprising the steps of:

configuring an equipment characteristic to implement a domain knowledge for equipment used in the manufacturing process; and implementing a workflow, the workflow representing a sequence of steps of the manufacturing process.

22. The electronic signal of claim 21, wherein the electronic signal is transmitted between a first computer system and a second computer system.

23. The electronic signal of claim 22, wherein the electronic signal is transmitted over a telecommunications network.

24. The electronic signal of claim 20, wherein the telecommunications network is a digital network.

25. The electronic signal of claim 23, wherein the telecommunications network is an analog network.

26. The electronic signal of claim 23, wherein the electronic signal allows users to view an equipment status over said telecommunications network.

27. A method of automating a microelectronic manufacturing process comprising the steps of:

(a) providing an application object implementing multiple variations of a command for corresponding respective versions of a process tool;

(b) configuring the application object for a specific process tool; and (c) performing a workflow having a sequence of steps in a microelectronic manufacturing process using a version of the process tool and the application object configured in said step (b).

28. The method of claim 27, wherein step (c) further comprises the sub-steps of:

(1) creating a workflow by a user; and (2) registering the workflow using a workflow engine.

29. A method of automating a manufacturing process comprising the steps of:

(a) providing an application object implementing multiple variations of a command for corresponding respective versions of a process tool;

(b) configuring the application object for a specific process tool; and (c) providing a sequence of steps in a manufacturing process using a version of the process tool and the application object configured in said step (b).

30. The method of claim 29, wherein step (c) further comprises the sub-steps of:

(1) creating a workflow, the sequence of steps derived from the workflow; and (2) registering the workflow using a workflow engine.

* * * * *